United States Patent Office 2,992,675
Patented July 18, 1961

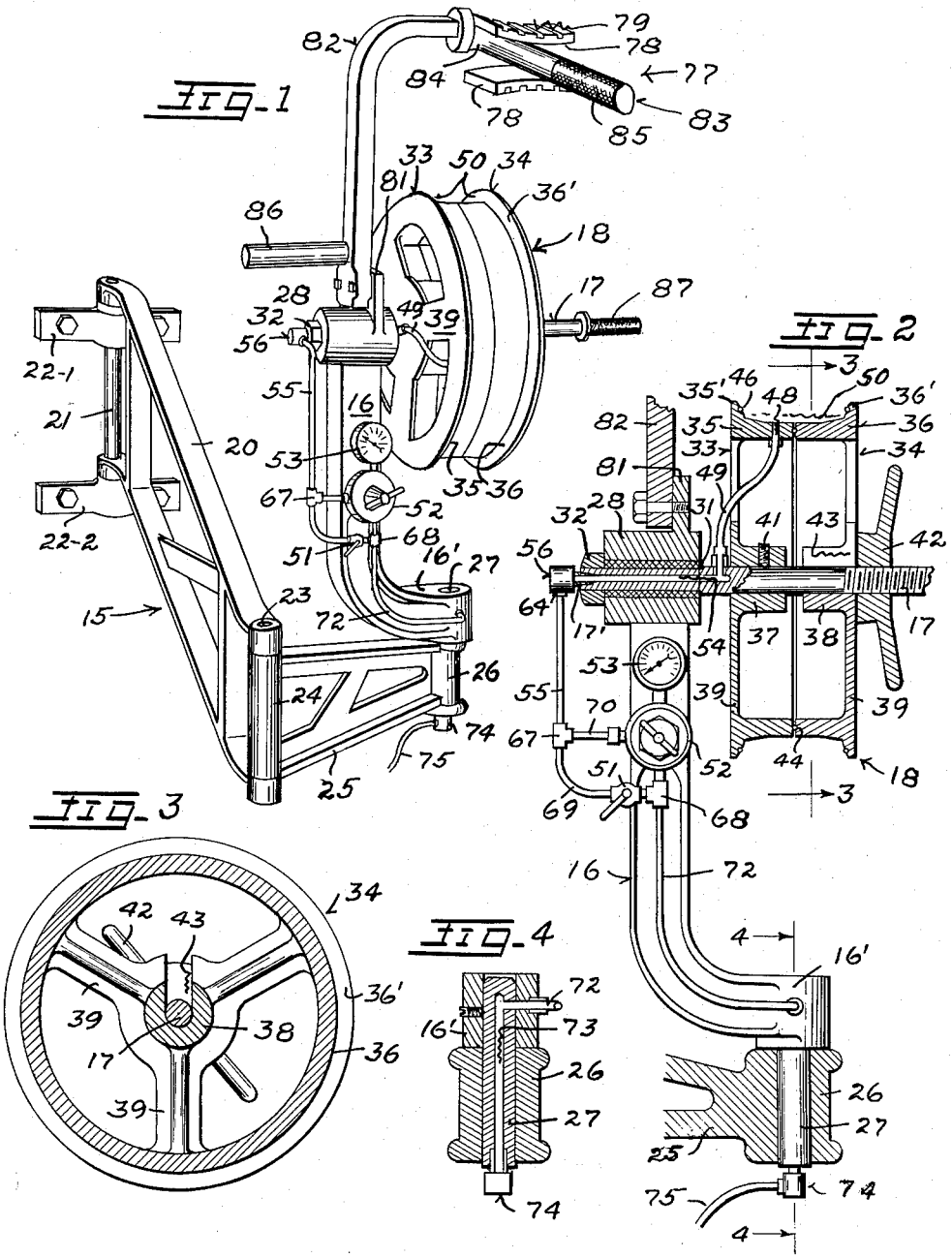

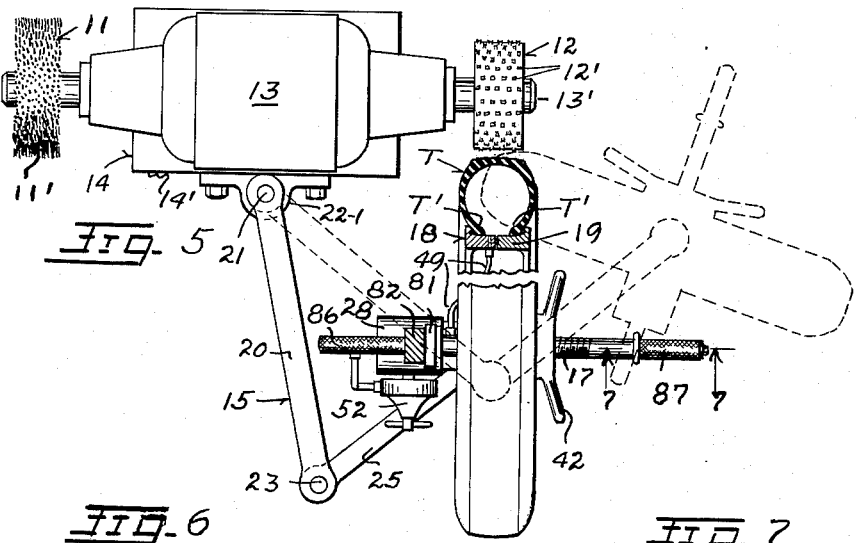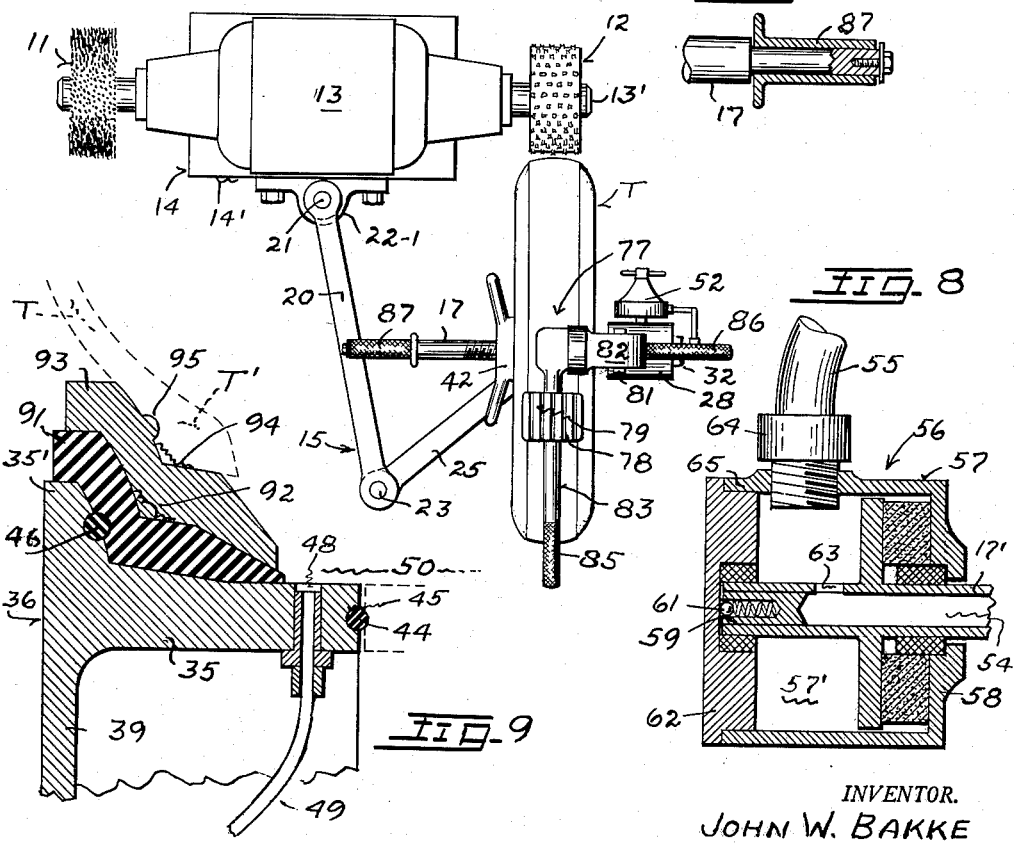
INVENTOR.
JOHN W. BAKKE
BY
Henry N. Young
ATTORNEY

2,992,675
TIRE-BUFFING MACHINE
John W. Bakke, Oakland, Calif., assignor, by decree of final distribution, to Norman W. Bakke and Jack W. Bakke, both of 1109 Buena Vista Ave., Alameda, Calif.
Filed Sept. 16, 1957, Ser. No. 684,211
1 Claim. (Cl. 157—13)

The invention relates to a unitary machine for uniformly removing remaining tread portions from worm vehicle tires of rubber or the like to prepare the tires for retreading.

A general object is to provide a machine comprising an improved tire-supporting assembly in unitary association with a power-driven rotary abrading drum and adapted for a particularly ready presentation of the tread portion of an inflated rim-mounted tire casing circumferentially thereof and against the drum at various angles for effecting a controlled full-width buffing of the tread with a minimum of mounting and dismounting operations with respect to the casing.

Another object of the invention is to provide a particularly simple and effective means for providing and maintaining the inflation of the mounted tire casing at a controlled predetermined pressure while the buffing of the casing is being effected, and without requiring the use of a separate inflated tube within the casing.

A further object is to provide a particularly simple and effective brake means for controlling the operative rate of the buffing action by the buffing drum.

An added object is to provide for a particularly simple and effective manual control of the working position of the tire tread and of the brake means.

Yet another object is to provide a tire-supporting assembly which is adapted for its mounting on the bases of different floor-supported makes of buffing stands.

A still further object is to provide for the mounting of tire casings having different bead circumferences on a primary casing-mounting rim of the machine.

The invention possesses other objects and features of advantage, some of which, with the foregoing, will be set forth or be apparent in the following description of a typical embodiment thereof, and in the accompanying drawings, in which, FIGURE 1 is a perspective view of a unitary tire-casing support arranged for its mounting on the pedestal of a power-driven abrading unit to provide the present tire-buffing machine.

FIGURE 2 is an enlarged upright and partly sectional view taken with reference to an upright plane passing through the axis of a tire-carrying wheel of the tire-mounting assembly.

FIGURE 3 is a sectional view taken at the line 3—3 in FIGURE 2.

FIGURE 4 is a section taken at the line 4—4 in FIGURE 2.

FIGURE 5 is a plan view, partly in section, showing the machine assembly as carrying a tire casing for application against an abrading drum.

FIGURE 6 is a view similar to FIGURE 5, but showing the wheel which mounts the casing in reversed relation with respect to its position in FIGURE 5.

FIGURE 7 is a fragmentary section taken at the line 7—7 in FIGURE 5.

FIGURE 8 is an enlarged sectional view of a swivel air-line connector of the assembly.

FIGURE 9 is an enlarged fragmentary sectional view of a portion of the casing-support wheel of FIGURE 5 as provided with adapters for sealedly mounting tire casings of larger bead diameters on the wheel rim.

The tire-buffing machine of my invention essentially comprises a combination with a grinding unit providing an abrading drum, of a special support for applying the tread of a tire casing mounted thereon against the drum. As is particularly brought out in FIGURES 5 and 6, the grinding unit includes a finishing or buffing drum 11 providing wire bristles 11' on its peripheral working face and a grinding or rasping drum 12 providing spokes or prongs 12' on its peripheral working face, with said drums directly mounted on the horizontally-disposed shaft 13' of an electric motor 13 carried at the top of a floor-supported pedestal or stand 14 in a usual arrangement for grinding and buffing units in which the drums 11 and 12 are directly mounted on the horizontally-disposed shaft 13' of the motor. In the present unitary assembly, the pedestal or stand 14 also mounts an articulated arm assembly 15 carrying at its extremity a standard 16 extending upwardly from it and journalling at its top a horizontally-disposed spindle 17 which in turn carries a wheel 18 providing a rim 19 on which a tire casing T may be mounted for a buffing of its tread. The articulation of the arm 15 is such that it provides for the application of a rim-mounted tire casing alternatively against the grinding and finishing drums 11 and 12 through a full range of angular relations which jointly provides for a removal of central or side parts of the original tread portion of the tire.

Referring more particularly to the disclosed structure of the articulated arm 15, it will be noted that the assembly thereof includes an inner section 20 hinged to a side 14' of the pedestal 14 by means of a vertical hinge pin 21 provided by the arm section 20 and engaging upper and lower bearing brackets 22–1 and 22–2 which are bolted to said pedestal side 14'. An upright hinge pin 23 suitably connects the outer end of the arm section 20 with an upright tubular knuckle 24 at the inner end of an arm section 25 provided at its other end with an upright bearing knuckle 26 which rotatably receives a stem 27 fixed at the bottom of the upstanding standard 16 in a top portion 28 of which the spindle 17 is suitably journalled for its rotation about a horizontal axis which is perpendicular to the stem axis. For providing the desired rigidity of support for the standard 16, the inner arm section 20 is relatively deep at the hinge pin 21, and the depth of the articulated arm assembly 15 progressively decreases to its end at the terminal bearing knuckle 26 thereof.

As shown, the wheel-carrying spindle 17 is provided with a shoulder 31 opposite and adjacent the portion 28 of the standard 16, and the spindle portion extending through the bearing at said standard portion has a collar 32 releasably fixed to an end part which extends beyond the standard portion 28, whereby the shoulder and collar are cooperative to prevent an axial shifting of the spindle in its mounting on the standard 16. As shown, and for facilitating a mounting and dismounting of a tire casing T on the wheel 18, said wheel is formed with axially separable inner and outer sections 33 and 34 respectively, comprising complementary rim portions 35 and 36 suitably connected to hub portions 37 and 38 by spokes 39 radiating from the hubs. The inner wheel section 33 is suitably fixed to the spindle 17, as by a setscrew 41 engaged in its hub 37, and the wheel section 34 is arranged to be releasably retained on the spindle by means of a wing-nut 42 threadedly mounted on the outer spindle portion and operative against the outer side of the wheel section 34 at its hub portion 38; the arrangement is preferably such that when the opposed edge faces of the rim portions 35 and 36 are engaged, the opposed hub portions are mutually spaced, as is disclosed in FIGURE 2. As particularly shown, the hub 38 of the outer wheel section 34 is provided between the bases of two spokes 39 thereof with a radial slot 43 extending from the hub bore and having a width at least equal to the spindle diameter whereby to provide for a mounting and dismounting of the section laterally of the spindle without necessitating a complete removal of the wing-nut 42 during the mounting or dismounting of a tire on the wheel rim 19 in the manner hereinafter described.

It will now be noted that the complementary rim portions 35 and 36 are arranged to mount a casing T as comprising a tubeless tire thereon, whereby to eliminate any requirement for the provision of an inflated separate tube in the mounted casing to condition the casing for the removal of its old tread. Accordingly, and as is brought out in FIGURES 2 and 9, a sealing O-ring member 44 is engaged between the opposed rim edges, and may be mounted in the inner edge face of the rim portion 35 by its retained engagement in a continuous complementary groove 45 provided in said face. The inner sides of the rim flanges 35' and 36' which are engaged by the beads T' of a mounted casing T may also mount sealing O-ring members 46 in complementary grooves provided therein, whereby the space of a mounted casing may be fully sealed off at its open side by the wheel rim while the wheel sections are clamped together by the action of the wing-nut 42 and the casing space contains air under a pressure which has been supplied through a radial opening 48 in the rim section 35 from an air-supply tube or pipe 49.

Understanding that the seal provided at the rim groove 50 defined between the beads can only be fully established and maintained by a desired and relatively high pressure in the space of a rim-mounted casing, means are preferably provided for having and automatically maintaining a desired constant pressure in a casing on the rim 19. Accordingly, and in lieu of providing a check valve in the tube 49, said tube is preferably connected with a source of inflating air under pressure through a valve means which is adapted to quickly supply inflating air at a high pressure and may thereafter supply air at an automatically regulated rate to maintain a desired pressure in the casing during its engagement as a workpiece by a drum 11 or 12. Essentially, the control of inflating air to the casing T is afforded through a hand-controlled supply-and-relief valve 51 and an automatic regulator valve 52 which are suitably interposed in the tube 49 and are controllable in accordance with the readings of an indicating pressure gauge 53 which is constantly connected to the tube 49 between the valve assembly 51—52 and the space of a mounted casing.

Since, as will be hereinafter brought out, the working application of a tire mounted on a present wheel involves an appreciable swinging adjustment of the tire about an upright axis as well as a considerable lateral shifting thereof, the air connections to the wheel rim 19 are preferably provided through and/or along the standard 16 and the spindle 17, with the valve and gauge assembly most conveniently mounted on the standard. As particularly shown in FIGURE 2, the tubular spindle portion which engages the bearing at the upper end part 28 of the standard 16 is provided with an axial bore 54 and the duct provided by said bore connects the tube 49 with a tube 55 through a hose connection 56 which is swiveled to the spindle end.

The structure of a suitable swivel hose connection 56 is generally indicated in FIGURE 8, and comprises a hollow cylindrical body 57 which axially and sealedly receives through an end wall 58 thereof a tubular spindle extension 17' which continues the spindle bore 54 and terminally mounts a sealing plug 59 providing a spring-loaded bearing ball 61 engaging the body end wall 62 opposite its end wall 58. The space 57' of the body 57 is connected to the duct 54 of the spindle 17 by a radial port 63 in the spindle extension 17' between the plug 59 and the spindle seal for the extension 17', and a fitting 64 provided in the side wall 65 of the body 57 connects the casing space with the tube 55.

As shown, the tube 55 extends from a T-fitting 67 which is connected with a T-fitting 68 by tubes 69 and 70 which have the supply-and-relief valve 51 and the automatic regulator valve 52 respectively interposed therein, whereby said valves are installed in operative parallel between the T-fittings 67 and 68. The pressure gauge 53 is conveniently connected in the discharge line from the regulator 52 whereby the pressure in the wheel-mounted tire may be constantly indicated. Air is supplied to the T-fitting 68 through a tube 72 which extends from a connection at the lower stem-mounting end 16' of the standard 16 with a duct 72 extending axially in the pivot stem 27 and connected at its bottom through a swivel connection 74, such as the connection 56, with a flexible tube or hose 75 extending from a source (not shown) of air under the maximum pressure to be utilized. At least the regulator valve 52 has its body suitably fixed to a side of the standard 16 at an intermediate point thereof whereby the control valve assembly 51—52 may be held in fixed relation to the standard for movement therewith.

It will now be particularly noted that the major portion of the standard 16 is laterally off-set from the axis of its arm-engaging stem 27 for a distance which provides for the extension of said axis in the central plane of the mounted wheel rim 19 and in perpendicularly intersecting relation to the axis of rotation of the spindle 17 and the rim rotatable therewith, whereby the standard is L-shaped. As particularly brought out in FIGURES 1 and 2 and 4, the bottom end or base portion 16' of the standard 16 which carries the stem 27 and extends radially of the stem provides a circular underface engaging the complementary top face of the terminal knuckle 26 of the support arm section 25, whereby the standard 16 may be held in rotatively adjusted relation with respect to the axis of the stem 27 with a slight degree of friction which has stabilizing utility in the operative manipulation of a mounted tire casing T with respect to an abrading drum 11 or 12, it being understood that the standard base portion 16' actually comprises a third section of the articulated arm support for a casing T on the wheel 18, and may be so referred to.

Since the engagement of the tread of a mounted tire casing against a rotating abrading drum 11 or 12 will urge a rotation of the casing and the mounting spindle 17, a brake means is provided for retarding the rotative rate of the casing below that which it would otherwise assume by reason of its contact with a buffing drum of the machine, and such a means most conveniently and preferably comprises a brake assembly 77 providing like friction shoes 78 which are appropriately swingable against the mounted casing in the plane thereof. As particularly shown, an ear 81 extends rigidly upwardly from the top portion 28 of the standard 16 and rigidly mounts an L-shaped arm 82 which extends upwardly in the plane of the standard 16 and swingably mounts at its extremity an arm 83 which is swingable in the central plane of the casing for an application of a brake shoe 78 against the opposed tread face.

The free outer portion 85 of the arm 83 is preferably knurled for its use as a lever handle, and the brake shoes 78 are fixed to and across the portion of the lever arm 83 between its parts 84 and 85 at correspondingly opposite points thereof. The working faces 79 of the fixedly related shoes 78 are directed away from each other, are cylindrically concave longitudinally thereof and are ribbed in lines parallel to the line of the lever arm 83, whereby a shoe 78 may be applied against a tire casing with a pressure which retards the drum-urged rotation of the casing to a desired degree, and so provides an adjustable rate of circumferentially rasping or buffing the tire tread while the ribbed face 79 of the applied shoe tends to maintain a fixed circumferential line of action of the shoe with respect to the engaged casing.

The manual positioning of the mounted tire casing during and between applications of the casing against either of the abrading drums is arranged to be effected by means of suitable handles which are fixedly related to the supporting standard 16 in parallel relation to the spindle 17. As particularly shown, a handle bar 86 extends rigidly from the bottom part of the arm 82 in a line parallel to the spindle 17, and the outer end of said spindle rotatably mounts a grip in the form of a sleeve 87 which may be optionally grasped as a positioning handle in lieu of the handle 86.

In order that a present machine may be utilized to the fullest possible degree for the retreading conditioning of tire casings of various sizes, it has been found that a rim 19 may advantageously be formed to have its peripheral groove 50 receive and sealedly engage the beads of tires having the smallest usual internal bead diameter; thirteen inches, for instance. Accordingly, and as indicated in the fragmentary section of FIGURE 9, mutually complementary fillet rings 91 may be provided for mounting in the groove 50 of the complementary rim sections 35 and 36 in sealed engagement with the rim flanges for providing seats 92 for tire beads of greater internal diameter than those arranged to directly engage a rim 19; the seats 92 of a cooperative pair of fillets 91 may accommodate tire casing beads having an internal diameter of fourteen inches, for instance. Particularly when, as is indicated, a fillet ring 91 is of a rubber or other slightly yielding material, it need not be provided with a special sealing ring at its seat portion which is arranged for its axial engagement with the outer side of a casing bead T'.

Further, the seats 92 of installed fillet rings 81 may mount additional fillet rings 93 providing seats 94 for a tire casing having beads of still larger internal diameter; fifteen inches, for instance. If a fillet ring 93 is of metal, as is indicated, its flange portion might then be provided with a groove carrying a sealing O-ring corresponding to the O-ring 46, or be provided with the illustrated circumferential integral sealing bead 95. It will, of course, be understood that the fillet rings provided may provide seats for accommodating tire casings of different inside diameters than those previously specified and may be provided in sets to cover a full range of possible use of a present casing-support wheel.

With particular reference to the present provision for sealing the beads of a tire casing in the seat provided by the groove 50 of a rim 19, or by fillet members which are designed to provide bead-engaging seats of larger diameters, it has been found that leakless seals at such bead-engaging seats may not always be assured, whereby some air leakage, however slight, may occur. Accordingly, it will be understood that the provision and constant functioning of the adjustable automatic regulator valve 52 to maintain a desired casing pressure during an abrading operation is of particularly practical importance in view of the fact that the present machine is designed for its use without requiring the installation and inflation and deflation and removal of separate inflating tubes, all while the casing is not being buffed. In contrast, the present casing inflation device is constantly and automatically operating to provide and maintain the best working pressure in a mounted casing being worked on, and only the quickly-accomplished mounting and dismounting of successive casings to be worked on halts the use of the machine.

By referring particularly to FIGURES 5 and 6, it will now be noted that a mounted casing T may be variously applied against a drum 11 or 12 by shifting its position with respect to the anchoring axis provided by the hinge pin 21 from which the articulated support arm 15 extends and which is fixedly related to the abrasion drums. Since, however, the drums are operative against the mounted casing at or adjacent the level of the support spindle 17 in a usual relation for machines of the present type, the abrading of the casing tread portion at one side of its central plane would be limited by the interference of the drum-rotating motor 13 whereby, in tire buffing machines heretofore known to me, it has been a necessary prior practice to remount a casing T which has been partly buffed in a reversed position on a support wheel for effecting the buffing of its tread at opposite sides of the wheel plane.

By reason, however, of the mutually perpendicular and novel intersecting relation of the axis of the wheel-mounting spindle 17 and the upright rotation axis for the standard 16 at the extremity of the articulated arm assembly, the present swinging adjustability of the spindle-carrying standard 16 about the stem 27 at its bottom provides for a reversal of the mounted casing about the latter axis whereby either side of the casing tread may be swung away from the motor 13 during its buffing, as indicated in FIGURES 5 and 6. In this manner, a complete buffing operation along and about the casing tread may be effected without requiring a dismounting and remounting of the casing with respect to the carrying wheel 18. It is important to note that the present casing-positioning device, coupled with the eliminated need for using an inflation tube in the inflated casing, provides for a truly finished abrading treatment of the tread of a mounted casing following a single casing-mounting operation, and so in a minimized time.

From the foregoing description taken in connection with the accompanying drawings, the advantages of the present tire-buffing machine will be readily understood by those skilled in the art to which the invention appertains. While I have described the principle of operation, together with arrangements which I now consider to comprise preferred embodiments thereof, I desire to have it understood that the showing is primarily illustrative, and that such changes and developments may be made, when desired, as fall within the scope of the following claim.

What is claimed is:

In a machine for abrading the tread of a pneumatic tire casing having a continuous inner slot defined between mounting beads for the casing, the combination with a fixedly disposed power-driven rotary abrading drum having a cylindrical working face, of a casing-mounting wheel having a rim providing a continuous peripheral groove providing outwardly directed seats in the corners defined between radial side flanges and the groove bottom and arranged to fittedly receive the bead portions of the tire casing in substantially pressure-sealed engagement therewith, a spindle rotatively carrying the wheel, an articulated arm extending from a fixed support and mounting the wheel-carrying spindle on its outer section for the angularly variable application of the tread of the tire mounted on the wheel against the working face of the abrading drum, upright hinge pins connecting the arm sections, and means constantly providing a connection between the space of the wheel-mounted casing and a source of compressed gas for effecting and automatically maintaining a regulated inflation pressure within the wheel-mounted casing while the casing is being rotated for its abrading engagement with the drum, the wheel-carrying spindle and the hinge pin of the outer arm being provided with axial ducts which are included in the connection between the space of the mounted casing and the source of the compressed inflating gas.

References Cited in the file of this patent

UNITED STATES PATENTS

| | | |
|---|---|---|
| 1,848,684 | Woock | Mar. 8, 1932 |
| 2,104,532 | Sommer | Jan. 4, 1938 |
| 2,189,203 | Glynn | Feb. 6, 1940 |
| 2,230,027 | Cobb et al. | Jan. 28, 1941 |
| 2,254,526 | Hawkinson | Sept. 2, 1941 |
| 2,443,955 | Guzick | June 22, 1948 |
| 2,515,167 | Arel | July 18, 1950 |
| 2,614,603 | Howley | Oct. 21, 1952 |
| 2,634,781 | Turek | Apr. 14, 1953 |
| 2,634,784 | Fitch | Apr. 14, 1953 |
| 2,707,851 | Strong | May 10, 1955 |
| 2,786,526 | Tobey | Mar. 26, 1957 |
| 2,872,978 | Bakke | Feb. 10, 1959 |
| 2,888,065 | Neilsen | May 26, 1959 |